United States Patent
Steiner

(10) Patent No.: US 8,561,008 B2
(45) Date of Patent: Oct. 15, 2013

(54) PRESENTATION OF HIERARCHICAL SOFTWARE STRUCTURES

(75) Inventor: Jochen Steiner, Rosstal (DE)

(73) Assignee: Siemens Aktiengesellschaft, München (DE)

( * ) Notice: Subject to any disclaimer, the term of this patent is extended or adjusted under 35 U.S.C. 154(b) by 1870 days.

(21) Appl. No.: 11/369,238

(22) Filed: Mar. 7, 2006

(65) Prior Publication Data

US 2006/0206837 A1    Sep. 14, 2006

(30) Foreign Application Priority Data

Mar. 10, 2005   (DE) .................. 10 2005 011 155

(51) Int. Cl.
*G06F 9/44*  (2006.01)
*G06F 3/048* (2013.01)

(52) U.S. Cl.
USPC ........... 717/100; 715/854; 715/819; 715/820; 715/828

(58) Field of Classification Search
None
See application file for complete search history.

(56) References Cited

U.S. PATENT DOCUMENTS

| | | | |
|---|---|---|---|
| 538,735 A | | 5/1895 | Lewis |
| 3,584,162 A | | 6/1971 | Krakinowski |
| 4,007,364 A | | 2/1977 | Ojima et al. |
| 5,621,905 A | * | 4/1997 | Jewson et al. ............... 715/841 |
| 5,860,009 A | * | 1/1999 | Uchihira et al. ............. 717/149 |
| 5,923,328 A | * | 7/1999 | Griesmer ..................... 715/854 |
| 5,956,016 A | | 9/1999 | Kuenzner et al. |
| 6,028,602 A | * | 2/2000 | Weidenfeller et al. ........ 715/781 |
| 6,144,962 A | * | 11/2000 | Weinberg et al. .................. 1/1 |
| 6,181,342 B1 | * | 1/2001 | Niblack ......................... 345/635 |
| 6,236,400 B1 | * | 5/2001 | Guerrero ....................... 715/841 |
| 6,237,006 B1 | * | 5/2001 | Weinberg et al. ............. 707/797 |
| 6,247,020 B1 | * | 6/2001 | Minard ............................... 1/1 |
| 6,380,947 B1 | | 4/2002 | Stead |
| 6,462,762 B1 | * | 10/2002 | Ku et al. ....................... 715/853 |
| 6,826,729 B1 | * | 11/2004 | Giesen et al. ................. 715/837 |
| 6,864,899 B1 | * | 3/2005 | Barrus et al. ................. 345/620 |
| 7,058,928 B2 | * | 6/2006 | Wygodny et al. ............. 717/128 |

(Continued)

FOREIGN PATENT DOCUMENTS

| | | |
|---|---|---|
| DE | 19757231 A1 | 7/1999 |
| EP | 0891893 A2 | 1/1999 |
| EP | 0947921 A2 | 6/1999 |
| JP | 2002190238 A | 5/2002 |

OTHER PUBLICATIONS

International Business Machines Corporation; "A dynamic tree GUI element for internet/intranet web applications in multi-user environments"; International Business Machines Research Disclosure, Sep. 2001, Mason Publications, Hampshire GB, Hire, GB, vol. 449, No. 124, XP007128978, 0374-4353, 2001.

*Primary Examiner* — Tuan Q. Dam
*Assistant Examiner* — Zheng Wei

(57) ABSTRACT

A method, a computer product and a device for presentation of elements of a software environment arranged in a hierarchical structure are provided. To allow an easy-to-understand and user-friendly navigable presentation of the elements, the following steps are proposed for the presentation: displaying a linear chain of precisely one representative element of each hierarchy level in each case, with the representative elements being arranged within the linear chain in accordance with their hierarchy level, and display of further elements of a first hierarchy level after the user has selected a first representative element of the linear chain which is assigned to the first hierarchy level.

11 Claims, 2 Drawing Sheets

(56) References Cited

U.S. PATENT DOCUMENTS

| | | | |
|---|---|---|---|
| 7,114,129 B2* | 9/2006 | Awada et al. | 715/786 |
| 7,216,303 B2* | 5/2007 | Aggarwal et al. | 715/825 |
| 7,404,149 B2* | 7/2008 | Fox et al. | 715/810 |
| 7,512,904 B2* | 3/2009 | Matthews et al. | 715/854 |
| 7,543,244 B2* | 6/2009 | Matthews et al. | 715/811 |
| 7,669,146 B2* | 2/2010 | Lauff | 715/854 |
| 2001/0020293 A1* | 9/2001 | Uchihira et al. | 717/4 |
| 2001/0043238 A1* | 11/2001 | Guerrero | 345/853 |
| 2002/0063738 A1* | 5/2002 | Chung | 345/810 |
| 2002/0120633 A1 | 8/2002 | Stead | |
| 2002/0120919 A1* | 8/2002 | Aizenbud-Reshef et al. | 717/127 |
| 2003/0088854 A1* | 5/2003 | Wygodny et al. | 717/130 |
| 2003/0214538 A1* | 11/2003 | Farrington et al. | 345/854 |
| 2003/0236925 A1* | 12/2003 | Balek et al. | 709/328 |
| 2004/0239683 A1* | 12/2004 | Chu et al. | 345/619 |
| 2005/0076312 A1* | 4/2005 | Gardner et al. | 715/853 |
| 2005/0091609 A1* | 4/2005 | Matthews et al. | 715/804 |
| 2006/0282243 A1* | 12/2006 | Childs et al. | 703/10 |
| 2012/0030631 A1* | 2/2012 | Gonzalez | 715/854 |

* cited by examiner

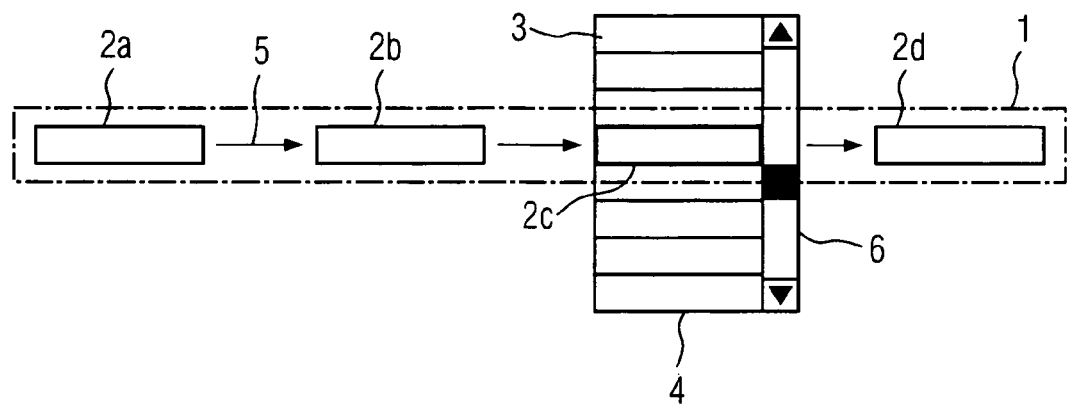
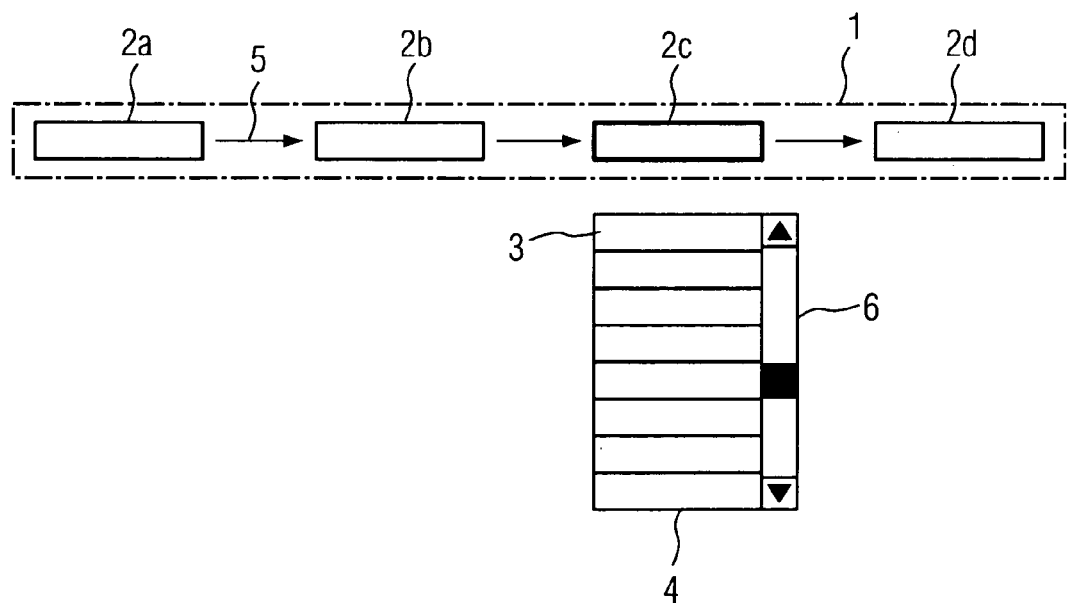

PRESENTATION OF HIERARCHICAL SOFTWARE STRUCTURES

CROSS REFERENCE TO RELATED APPLICATIONS

This application claims priority to the German application No. 10 2005 011 155.6, filed Mar. 10, 2005 which is incorporated by reference herein in its entirety.

FIELD OF INVENTION

The invention relates to a method, a computer program product and a device for presentation of elements of a software environment arranged in a hierarchical structure.

BACKGROUND OF INVENTION

Such a method, computer program product or such a device is used with graphical user interfaces with which hierarchical structures are to be displayed. This can for example involve a file management system such as Windows Explorer with which files can be arranged hierarchically. Various project planning tools generally also feature hierarchically structured elements. A tool for project planning of a drive system would for example offer different drive concepts under the general heading of drives. Different controller strategies are under some circumstances available for each drive concept, and these strategies in their turn can be arranged hierarchically below the drive concepts. A further example is graphics programs, with which for example a very wide variety of tools are hierarchically assigned to the corresponding generic headings.

SUMMARY OF INVENTION

These types of hierarchical structures are presented as a rule in the form of a tree on a screen, as is known for example from Windows Explorer. Depending on the size of the tree a user is provided with scroll bars with which it is possible to "scroll through" the tree vertically and/or horizontally. Since with very extensive trees users can frequently lose their overview of the position of an element within the hierarchical structure, the current path of a selected element is displayed in addition to the tree.

An underlying object of the invention is to make possible a clearly structured and user-friendly navigable presentation of hierarchically arranged elements.

This object is achieved by a method for presentation of elements of a software environment arranged in a hierarchical structure,.with the following steps:

Displaying a linear chain consisting of precisely one representative element of each hierarchy level in each case, with the representative elements being arranged within the linear chain in accordance with their hierarchy level and Displaying further elements of a first hierarchy level, after a user has selected a first representative element of the linear chain which is assigned to the first hierarchy level.

This object is achieved by a computer program product for executing such a method.

The object is further achieved by a device for presentation of elements arranged in a hierarchical structure of a software environment with First means for displaying a linear chain of at least one representative element of each hierarchy element in each case, where the representative elements are arranged within the linear chain in accordance with their hierarchy level and Second means for displaying further elements of a first hierarchy level, after a user has selected a first representative element of the linear chain which is assigned to the first hierarchy level.

The invention is based on the knowledge that, especially with very large hierarchical structures, a display in the form of a linear chain can be very much more straightforward and simple to navigate for a user than the usual presentation of such structures in the form of a tree. The linear chain corresponds to a navigable path within which each hierarchy level is represented by exactly one representative element. The representative elements shown can be selected for the user for example with the aid of a mouse pointer. As soon as the user selects a representative element, the further elements which are components of the hierarchy level of the selected element are displayed.

The representative element of each hierarchy level can generally be freely selected by the user. Thus for example, after the further elements are displayed on the screen, the user can select one of these elements. The element thus selected is subsequently shown as the representative element of the corresponding hierarchy level within the linear chain, as soon as the list of the further elements of this hierarchy level is closed again.

With the inventive presentation of the hierarchical structure in the form of a navigable path display or a linear chain, the user very easily obtains an overview of the current position of each element displayed within the hierarchical structure. By contrast with a presentation of a comprehensive hierarchical structure in the form of a tree, no scrolling is necessary with this method. The space required for the navigable path display is also far less compared to a tree display. This is especially true if the user does not wish to actively navigate, when the further elements will thus not be shown on the screen. The last-mentioned advantage is of especially great importance with applications of which the main task is not navigation within the hierarchical structure itself. Finally with the proposed inventive presentation of the hierarchical structure in the form of a linear chain, the additional display of a path specification for a selected object is also not necessary. On the basis of the linear chain displayed, the user can very quickly read off the paths of the individual representative elements.

Different types of presentation are conceivable for the presentation of the linear chain on a screen and are covered by the invention. In a first embodiment of the invention, when the linear chain of the representative elements is displayed, the elements are arranged in a horizontal direction in ascending or descending order on screen, and especially separated from each other by separator characters. As an alternative to this, in a second embodiment of the invention, when the linear chain is displayed, the representative elements are arranged in a vertical direction in ascending or descending order, and especially separated from each other by separator characters.

In a useful embodiment the further elements will be displayed in the form of a list. Within the list the further elements can be arranged vertically or horizontally. Different embodiments are also conceivable for the position of such a list on the screen and are covered by the invention. For example the list can be arranged immediately above the selected first representative element so that the first representative element appears directly as a list element. As an alternative to this, the list can be arranged below or above the first representative element selected by the user.

Especially if the list contains a large number of elements it makes sense for a list to feature a scroll bar. The scroll bar enables the user to select further elements which for space reasons cannot be presented directly on the screen.

Different embodiments also exist for presenting the elements of the software environment, and these are also covered by the invention. For example it can be useful to show the elements of the software environment in graphical form. This can be done for example in the form of an icon. As an alternative to this, the elements of the software environment can be shown in text-based form.

The linear chain is primarily used to select an element from a list of existing elements. With a file management system the elements involved are as a rule file names. As an alternative however, the elements can also represent functions of the software environment. For example, in a second hierarchy level below the first hierarchy level, an element can be arranged which calls a function with the aid of which a new hierarchy element of the second hierarchy level will be generated.

Depending on the structure depth of the hierarchical structure it can be possible for the elements of the linear chain to no longer be able to be displayed in one line on a screen. In such a case the display of the navigable path can be divided up into a number of lines. With a text-based presentation of the elements of the linear chain the displayed text of the levels can be shown abbreviated. Only when the element is selected with the aid of the mouse pointer will the full name of an element be displayed.

Furthermore it makes sense, with a very large structure depth of the hierarchical structure, to replace the topmost hierarchy levels or hierarchy levels in the middle of the hierarchy by dots.

In an advantageous application the method is especially provided for presentation of elements of a project planning tool, especially for automation technology. Very complex tools are frequently used for the project planning of automation technology systems in which the user is provided with different hierarchically arranged elements.

BRIEF DESCRIPTION OF THE DRAWINGS

The invention is described and explained in more detail below on the basis of the exemplary embodiments shown in the Figures. The figures show.

DETAILED DESCRIPTION OF THE DRAWINGS

Figure 1:
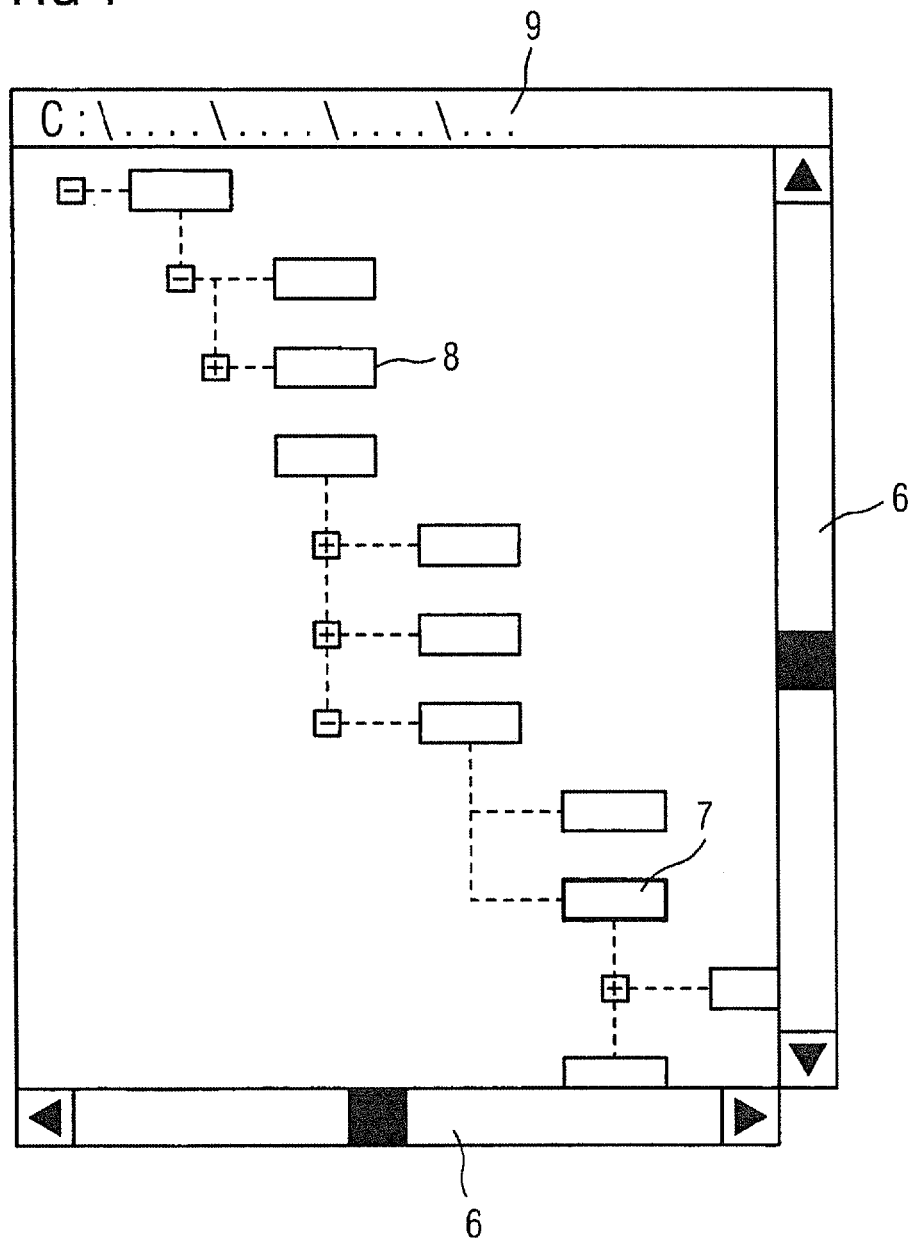
FIG. 1 a search tree for presentation of a hierarchical structure in accordance with the prior art, FIG. 2 a presentation of elements arranged in a hierarchical structure in accordance with a first embodiment of the invention and FIG. 3 a presentation of elements arranged in a hierarchical structure in accordance with a second embodiment of the invention

FIG. 1 shows a search tree for presentation of a hierarchical structure in accordance with the prior art. As to a result of the considerable space required by this form of presentation, both a vertical and also a horizontal scroll bar 6 is provided for presentation of the structure on the screen, said scroll bars allowing a user to select the elements which could not be presented for reasons of space.

After the user has selected an element of the search tree with the mouse a path specification 9 shows the position of the selected search tree element 7 within the hierarchical structure. This is necessary because of the comparatively complex form of presentation of the structure.

If the user now wishes to select a further element which for example is hierarchically below the search tree element of a second hierarchy level 8 of the structure, numerous mouse clicks are required depending on the hierarchical depth of the further element.

FIG. 2 shows a presentation of an element arranged in a hierarchical structure in accordance with a first embodiment of invention. The hierarchical structure features four hierarchy levels, with each hierarchy level being represented by a representative element 2a, 2b, 2c, 2d. Thus the highest hierarchy level is represented by a first representative element 2a, the second hierarchy level by a second representative element 2b, the third hierarchy level by a third representative element 2c and the fourth by a fourth representative element 2d. These levels are intended here to represent the hierarchy levels of a project planning tool for automation technology for example. For example different drive systems of an automation system can be configured with this project planning tool.

In the scenario presented the user uses a mouse pointer to select the third representative element 2c of the linear chain 1. As soon as this third representative element 2c is marked, a list 4 opens in which further elements 3 are displayed. The selected representative third element 2c is for example a specific drive system which can be selected from a list of a very wide variety of drive systems. The user now has the opportunity to select from the list 4 a further element 3 which represents an alternative drive system. Within the hierarchy level lying below this one, which is represented by the fourth representative element 2d, the user can subsequently set certain parameters for the selected drive system. It is possible to select the parameters in a similar manner.

The diagram shown in FIG. 2 of the hierarchical structure allows the user to navigate very easily. By contrast with the widely used tree presentation of hierarchical structures, the user can jump very quickly from one element to another within the linear chain 1. By selecting one of the representative elements 2a, 2b, 2c, 2d, the user has very rapid access to each element of the hierarchical structure regardless of its position within the hierarchical structure. If a specific required value is set for a first drive system within the lowest hierarchical structure and if the same required value is to be used for an alternate drive system it is merely necessary to select this alternate drive system within the last-but-one hierarchy level. Reselecting the corresponding required value within the lowest hierarchy level is in this case not necessary, by contrast with the tree structure.

The individual representative elements 2a, 2b, 2c, 2d are separated from one another within the linear chain 1 by separator characters 5 which are embodied as arrows. The list 4 of the further elements 3 is placed in the embodiment shown in FIG. 2 directly above the third representative element 2c selected by the user, so that this element appears directly as a component of the list 4. In addition to this the list 4 contains a scroll bar 6 with which the user can scroll through the list. In this way an abbreviated form of presentation is possible which can be of advantage for very large lists with very many elements.

FIG. 3 shows a presentation of elements arranged in a hierarchical structure in accordance with a second embodiment of invention. Here too the hierarchical structure is shown in the form of a linear chain 1. Reference symbols and designations of the elements of the linear chain 1 correspond to those already used in FIG. 2.

In FIG. 3 too the third representative element 2c will be selected by a user with the aid of a mouse, so that a list 4 with further elements 3 opens. By contrast with the diagram shown in FIG. 2, the list is displayed here below the selected third representative element 2c. This form of presentation is particularly advantageous if the list 4 is wider than the selected third representative element 2c. As an alternative the list 4 can of course also be displayed above the selected third representative element 2c.

Also in the case shown here the space requirement for displaying a hierarchical structure is significantly smaller than with the tree-type presentation The user very quickly obtains an overview on the basis of the presentation as a linear chain 1 of the position within the hierarchical structure of a particular element without an additional explicit path specification being required for this.

The present invention is not intended to be limited to the exemplary embodiments shown here. Instead further embodiments are conceivable and are covered by the invention provided the basic idea is retained of a hierarchical structure being presented in the form of a linear chain consisting of representative elements for each hierarchy level and of the user, after selecting a representative element, obtaining a list of further elements of the selected hierarchy level. Thus for example, as well as the horizontal embodiments of the linear chain shown in FIGS. 2 and 3, a vertical presentation of the hierarchical structure is also conceivable and is covered by the invention. In such a case the obvious choice would be to arrange the list 4 of the further elements 3 next to the selected representative elements 2a, 2b, 2c, 2d. It is not mandatory for the list elements to be arranged vertically. A horizontal listing of further elements is also conceivable and is covered by the invention.

FIGS. 1 and 2 intentionally show the elements of the hierarchical structure schematically simply in the form of rectangles. With a concrete form of presentation the elements of the hierarchical structure can be presented in the text-based form, e.g. in the form of a link which provides the user with further data. As an alternative a graphical representation of the elements of the hierarchical structure is also conceivable.

To make it easier to learn the navigation display it makes sense to refer back to known existing forms of presentation which can be set up with the mouse. These can for example also be buttons or selection lists (drop-down lists).

The invention claimed is:

1. A method for displaying elements of a software environment arranged in a hierarchical structure, comprising:
    displaying a horizontal linear chain consisting of exactly one representative hierarchy element for each hierarchy level corresponding to a navigable path in the hierarchical structure, the representative hierarchy elements arranged horizontally following one another in succession within the linear chain according to the respective hierarchy level, wherein each representative hierarchy element is selectable to allow for viewing of its component elements, and wherein the component elements remain hidden from view in a space saving manner until selected so that only the horizontal linear chain is viewable as the navigable path consisting of exactly one representative hierarchy element for each hierarchy level;
    upon receiving a selection by a user of a selected hierarchy representative element at any location in the horizontal linear chain, opening a vertically arranged list that displays all component elements of the selected hierarchy representative element, wherein the vertically arranged list is displayed directly atop the selected representative element in the horizontal linear chain, with the selected representative element appearing as one of the component elements of the vertically arranged list; and
    upon receiving a selection by the user of an alternate one of the component elements of the vertically displayed list, closing the vertically arranged list and updating the displayed representative hierarchy element at the location in the horizontal linear chain to correspond to the alternate one of the component elements selected by the user, wherein the component elements are again hidden from view in a space saving manner so that only the horizontal linear chain is viewable as an updated navigable path consisting of exactly one representative hierarchy element for each hierarchy level based on the selection of the alternate one of the component elements.

2. The method in accordance with claim 1, wherein the representative elements are arranged horizontally in ascending or descending order in the linear chain.

3. The method in accordance with claim 1, wherein the list includes a scroll bar.

4. The method in accordance with claim 1, wherein the representative elements of the linear chain and the further elements of the list are presented in graphical or text-based form.

5. The method in accordance with claim 1, wherein the representative elements of the linear chain and the further elements of the list represent functions of the software environment.

6. A computer program which comprises a non-transitory computer readable storage medium where the computer program can be stored and read and executed by computer hardware for displaying elements of a software environment arranged in a hierarchical structure, comprising software code having software modules configured to:
    display a horizontal linear chain consisting of exactly one representative hierarchy element for each hierarchy level corresponding to a navigable path in the hierarchical structure, the representative hierarchy elements arranged horizontally following one another in succession within the linear chain according to the respective hierarchy level, wherein each representative hierarchy element is selectable to allow for viewing of its component elements, and wherein the component elements remain hidden from view in a space saving manner until selected so that only the horizontal linear chain is viewable as the navigable path consisting of exactly one representative hierarchy element for each hierarchy level;
    upon receiving a selection by a user of a selected hierarchy representative element, at any location in the horizontal linear chain, open a vertically arranged list that displays all component elements of the selected hierarchy representative element, wherein the vertically arranged list is displayed directly atop the selected representative element in the horizontal linear chain, with the selected representative element appearing as one of the component elements of the vertically arranged list; and
    upon receiving a selection by the user of an alternate one of the component elements of the vertically displayed list, close the vertically arranged list and update the displayed representative hierarchy element at the location in the horizontal linear chain to correspond to the alternate one of the component elements selected by the user, wherein the component elements are again hidden from view in a space saving manner so that only the horizontal linear chain is viewable as an updated navigable path consisting of exactly one representative hierarchy element for each hierarchy level based on the selection of the alternate of one of the component elements.

7. The computer program in accordance with claim 6, wherein the representative elements are arranged in ascending or descending order and separated from each other by separator characters in the linear chain.

8. The computer program in accordance with claim 6, wherein a scroll bar is displayed for scrolling the list.

9. The computer program in accordance with claim 6, wherein the representative elements of the linear chain and the further elements of the list are displayed in a graphical or text-based form.

10. The computer program in accordance with claim 6, wherein the representative elements of the linear chain and the further elements of the list represent functions of the software environment.

11. The computer program in accordance with claim 6, wherein the representative elements of the linear chain and the further elements of the list are elements of a automation technology project planning tool.

* * * * *